Oct. 7, 1930.  J. C. BARBEE  1,777,780
BEARING SCRAPER
Filed Jan. 28, 1929
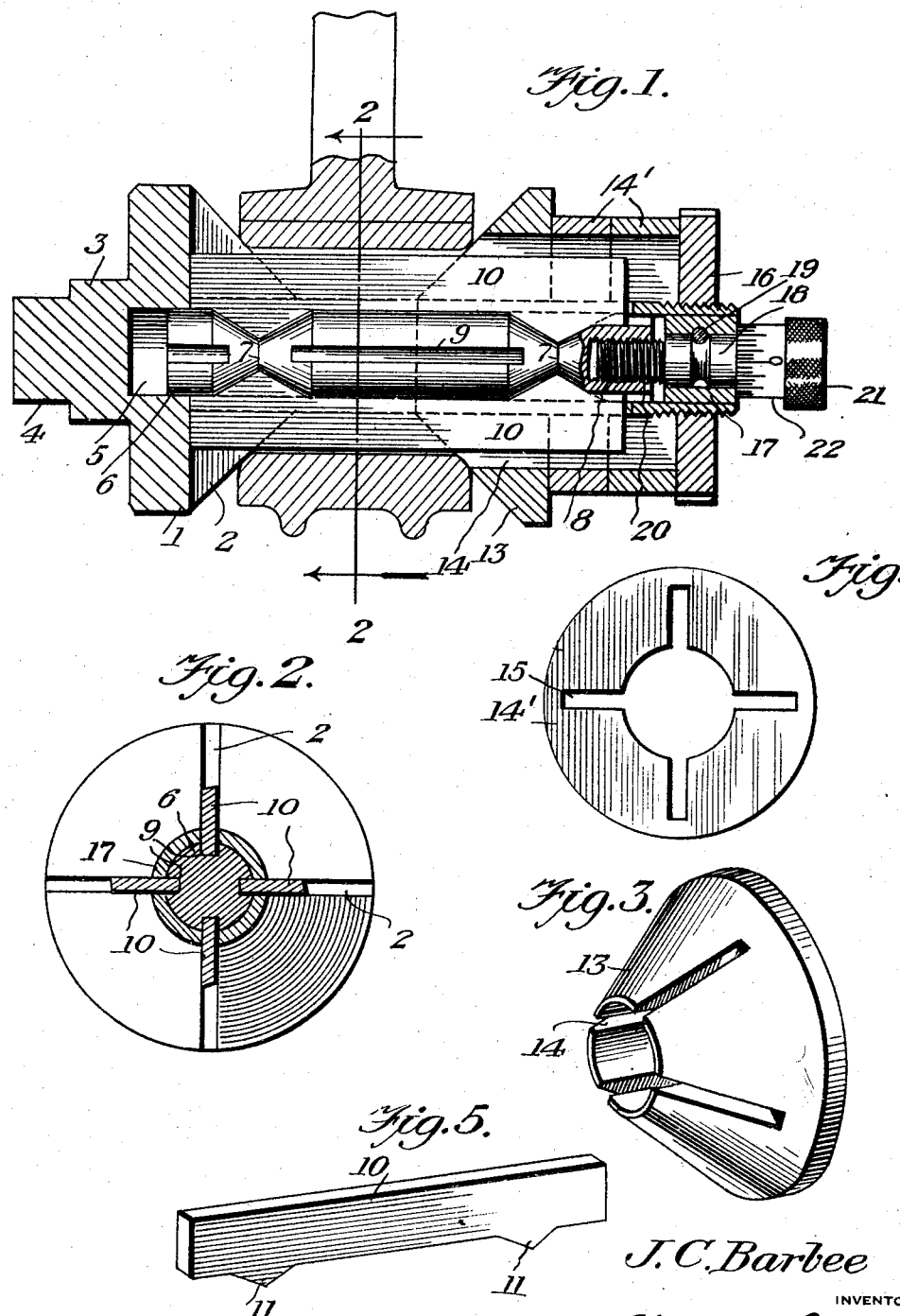

Patented Oct. 7, 1930

1,777,780

UNITED STATES PATENT OFFICE

JOSEPH C. BARBEE, OF DES MOINES, IOWA

BEARING SCRAPER

Application filed January 28, 1929. Serial No. 335,594.

My present invention has reference to a bearing scraper for the crank shaft or similar bearings of automobiles, the object being the provision of a device for this purpose in which the bearing is positively held with respect to the scraper blades and the scraper blades are micrometrically adjusted so that the bearing will be properly scraped.

To the attainment of the foregoing, the invention consists in the improvement hereinafter described and definitely claimed.

In the drawings:

Figure 1 is a longitudinal sectional view through the improvement in applied position.

Figure 2 is a sectional view on the line 2—2 of Figure 1, with the bearing removed.

Figure 3 is a perspective view of the removable cone.

Figure 4 is an end view of one of the spacer washers.

Figure 5 is a perspective view of one of the scraper blades.

In carrying out my invention I employ a cone head 1, which on its flared face, is formed with any desired number of slots 2, four of which being shown in the drawings. The rear and flat face of the cone head 1 is centrally formed with an enlargement 3 that merges into a squared portion 4 that is designed to be clamped between the jaws of a vice. The head 1, from the outer center thereof, is provided with an opening or socket 5 for the reception of one end of a cross sectionally round blade holder 6. In the showing of the drawings the blade holder, adjacent to its ends, is formed with substantially V-shaped depressions 7, respectively, and the outer end of the blade holder is provided with a threaded bore or socket 8. The blade holder 6 is provided with slots 9 designed to register with the slots or notches 2 in the head 1 and these alining notches are adapted to receive therein blades 10, best shown by Figure 1 of the drawings. Each of the blades has on its inner face and adjacent to its ends an angle extension 11 to be received in the V-shaped notches 7 of the holder 6. When the blade holder is arranged in the socket 5 of the head 1 and the blades are positioned in the head and holder the bearing 12 to be scraped is arranged over the blades and one end thereof is brought to contact with the conical head 1. Thereafter I arrange over the blades a removable conical member 13 provided with notches 14 to receive the blades therethrough. Thereafter I arrange against the outer and straight face of the head 13 spacer washers 14' which may vary in width, and which have slots or notches 15 entering from their bores to receive therethrough the ends of the blades 10.

Contacting with the outer washer 14' there is a lock nut 16 which is preferably peripherally notched and screwed through the lock nut there is a bushing 17 that has arranged in its bore a tubular or cross sectionally rounded shank 18. The shank 18 is provided with an annular groove and the bushing 17 has passed therethrough a pin 19 that is received in the said groove. Thus the bushing is held from longitudinal movement through the lock nut. The bushing 17 is either secured in or formed with the head 1 and surrounds the bore 5 thereof. The bushing is provided with openings that aline with the openings in which the blades are received. The spindle 18 has an inner threaded end 20 which is screwed in the bore 8 of the blade holder 1, the outer portion of the shank 18 being enlarged and having its extremity provided with a milled head 21. The enlarged portion of the shank 22 has micrometric inscriptions which may be numbered and which, of course, registered with an indicator mark on the outer end of the bushing. Thus when the lock nut is screwed home and the head 21 of the shank 18 is turned to move the holder 6 longitudinally through the tool the blades 10 may be projected to scrape the bearing 12 to a desired degree. The conical heads 1 and 13 hold the bearing from longitudinal movement, and it is merely necessary to turn the bearing around the tool in order that the Babbitt metal lining on the bore thereof may be easily and quickly scraped. The bearing may be quickly disassociated from the device by merely removing the lock nut, the spacer washers, head 13, blades and blade holder from the fixed head 1.

The simplicity of the construction and the advantages thereof will, it is thought, be understood and appreciated by those skilled in the art to which the invention relates but obviously I do not wish to be restricted to the precise structure herein set forth and, therefore, hold myself entitled to make such changes therefrom as fairly fall within the scope of what I claim.

Having described the invention, I claim:

In a bearing scraper, a slotted cone-shaped head having a squared face provided with an extension designed to be gripped between the jaws of a vise and having a rounded bore entering from its outer end, an elongated spindle extending from the head and provided with slots for the major portion of its length which register with the slots in the head, a longitudinally grooved blade holder received in the bushing and in the bore of the head and having annular V-shaped notches adjacent the ends thereof, blades received in the grooves of the blade holder and passing through the notches in the bushing and head, each of said blades having a V-shaped projection to be received in the V-shaped portions of the blade holder, said blades designed to receive thereover a bearing to be scraped and which bearing is designed to contact with the conical head, a second conical head which is notched from its bore arranged over the bushing, contacting with the second end of the bearing and receiving the blades therethrough, spacer washers contacting the outer face of said conical member, a lock nut screwed on the threaded end of the bushing and contacting with the spacer washers and means held from longitudinal movement but revoluble through the threaded end of the spindle and coengaging with the end of the blade holder adjacent thereto for imparting longitudinal movement to the blade holder.

In testimony whereof I affix my signature.

JOSEPH C. BARBEE.